Oct. 16, 1945.   E. M. RUNQUIST ET AL   2,387,185
MACHINE DRIVE AND CONTROL
Filed Jan. 24, 1942   4 Sheets-Sheet 1

Inventors.
Ernest M. Runquist
Lothar A. Ederer
by Parker + Carter
Attorneys.

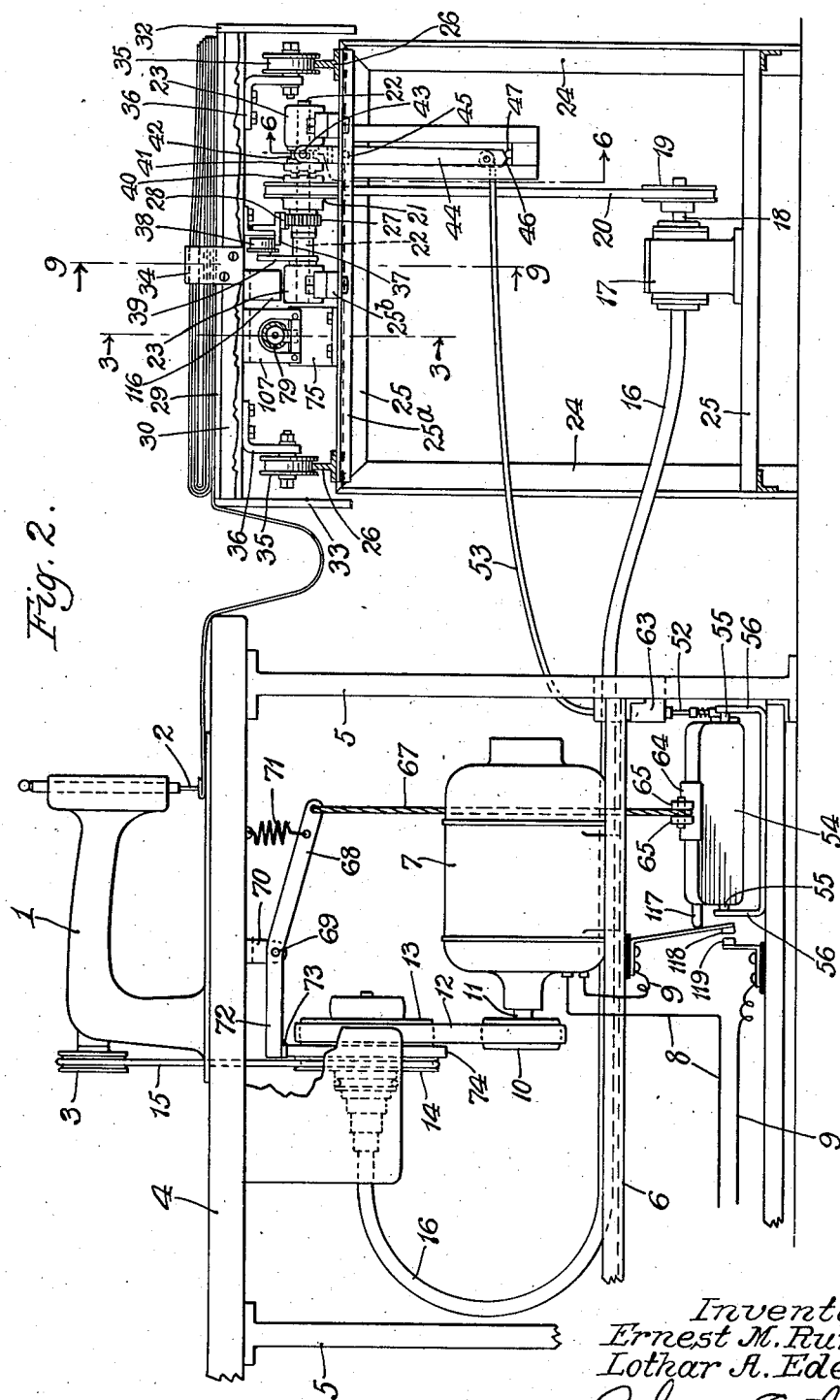

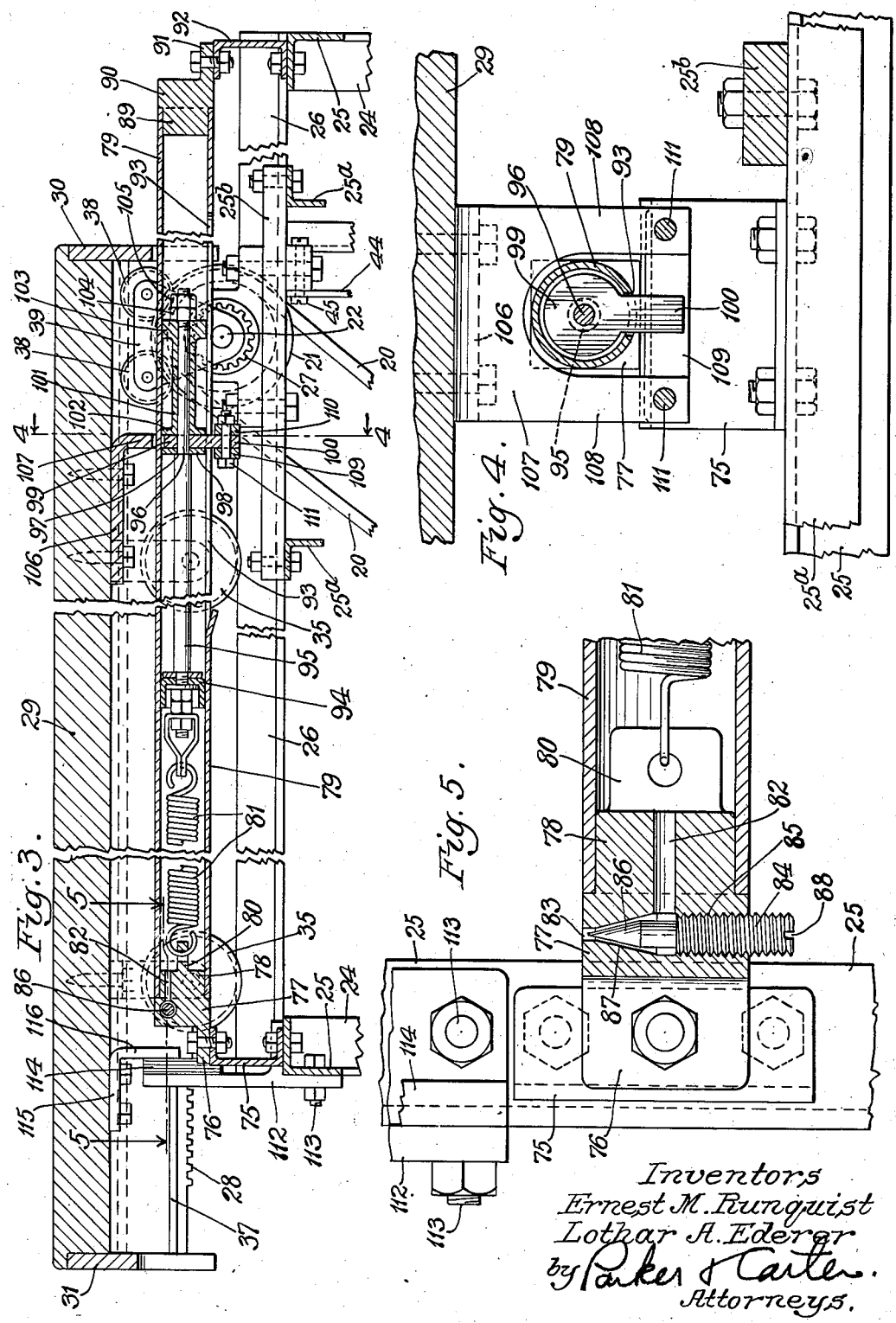

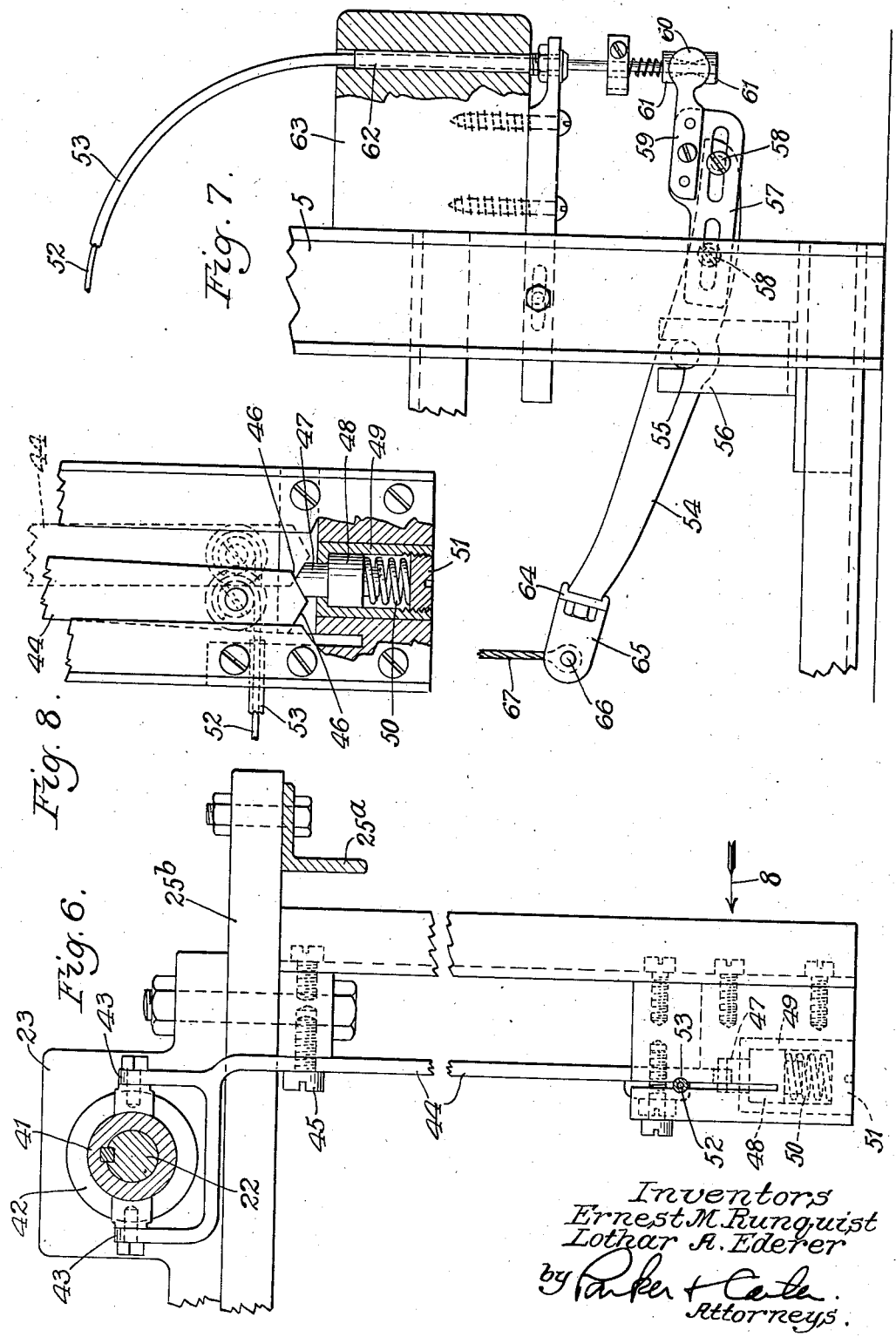

Patented Oct. 16, 1945

2,387,185

UNITED STATES PATENT OFFICE 2,387,185

MACHINE DRIVE AND CONTROL

Ernest M. Runquist and Lothar A. Ederer, Chicago, Ill., assignors to R. J. Ederer Company, Chicago, Ill., a corporation of Illinois Application January 24, 1942, Serial No. 428,038

5 Claims. (Cl. 112—2)

This invention relates to a material handling means, and primarily to a mechanism which is adapted to be associated with a working machine, and which is arranged to carry material to be moved back and forth past the machine.

It has, therefore, for one object, to provide a mechanism for carrying a work piece past a machine which is to accomplish work on it.

Another object is to provide a driving mechanism for a work carrier and for a machine whereby the two are driven in synchronism.

Another object is to provide a mechanism for carrying a work piece past a machine at a speed which is coordinated with the speed of operation of the machine, and for returning the carrier at a more rapid speed.

Another object is to provide a coordinated driving means having a single control for driving a working machine and for driving a work piece carrier.

Other objects will appear from time to time throughout the specification and claims.

This invention is illustrated more or less diagrammatically in the accompanying drawings, wherein:

Figure 2 is an end elevation with parts in section on line 2—2 of Figure 1.

Figure 3 is a longitudinal vertical sectional view of the carrier assembly, taken on an enlarged scale at line 3—3 of Figure 2.

Figure 4 is a transverse vertical sectional detail taken at line 4—4 of Figure 3 on an enlarged scale.

Figure 5 is a horizontal sectional detail taken at line 5—5 of Figure 3 on an enlarged scale.

Figure 6 is a longitudinal vertical sectional detail taken at line 6—6 of Figure 2.

Figure 7 is a side elevation with parts in section and parts omitted showing the pedal control for the drive.

Figure 8 is a view in vertical sectional detail taken at the arrow of Figure 6, illustrating the clutch mechanism.

Like parts are indicated by like characters throughout the specification and the drawings.

Figure 1:
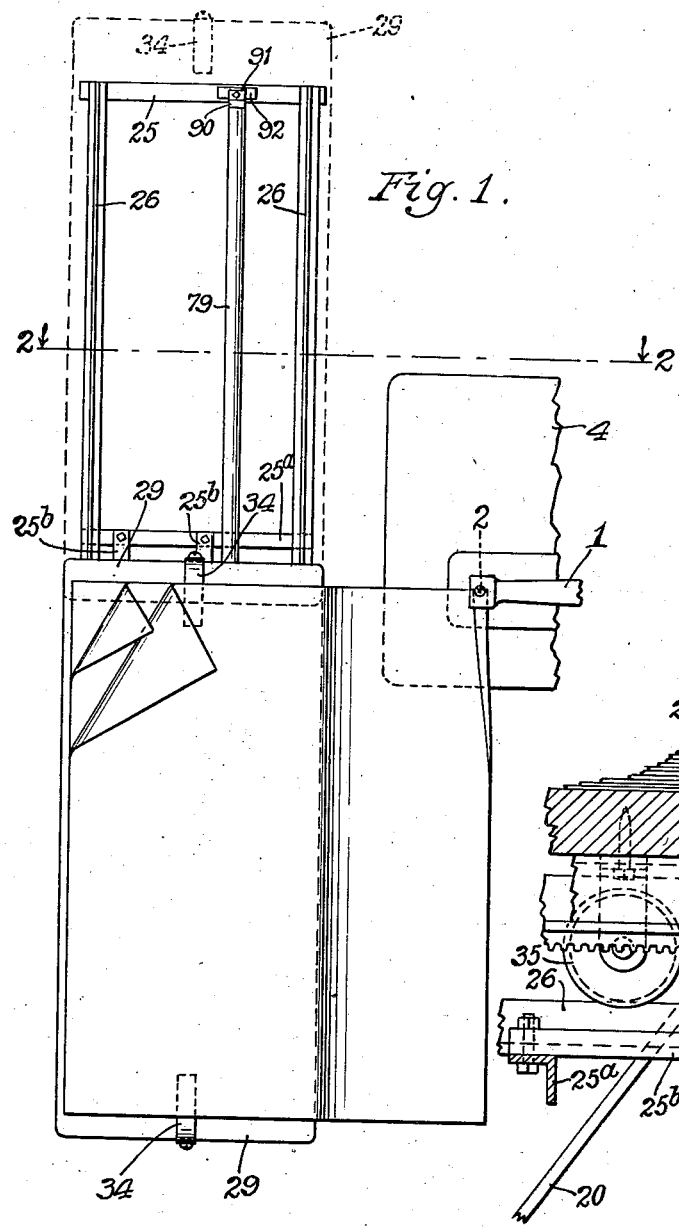
Figure 1 is a plan view of one form of the device.

As shown in the drawings, the invention is embodied in the combination with a sewing machine of means for carrying material which is to be sewn past the sewing machine. These means include a drive and a control for the drive. The drive is actuated at such speed that it moves the material which is to be sewn past the sewing machine at the proper speed for the operation of the sewing machine so that the seam is made or the sewing is done at the most efficient speed. The drive also includes means for returning the work carrier at a more rapid speed. This is preferable because on the return movement no sewing is done. Hence, the carrier may move more rapidly than is possible when sewing takes place during its movement.

As shown, the sewing machine is of conventional type and is mounted on a table or support of conventional type. Thus, the sewing machine comprises generally a sewing machine 1 which has a needle 2 mounted for reciprocation by the usual means. A drive pulley 3 is mounted on a suitable shaft not shown, and when it is rotated, the sewing mechanism is operated. The sewing machine as shown is mounted on a table 4 which is carried by suitable supports 5. Positioned on a cross member 6 of a table assembly is a driving motor 7 to which current is supplied by conductors 8 and 9. A driving pulley 10 is mounted on a shaft 11 of the motor 7 and by means of a belt 12 drives a pulley 13, which is suitably supported on a shaft not shown. This pulley may be of any desired type. As shown, means are provided for driving a second pulley 14 from the pulley 13, and a belt 15 engages the pulley 14 and engages also the sewing machine pulley 3 so that the latter is driven from the motor 7 through the pulleys and the belts shown. The particular details of this part of the transmission may be very largely changed without departing from the spirit of the invention, which is not limited to any particular arrangement of pulleys or belts. It is sufficient for the purposes of this invention that means are provided for driving the sewing machine.

Figure 9:
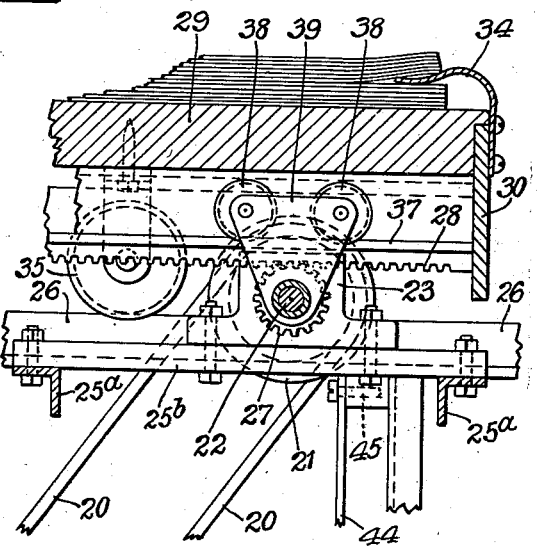
Figure 9 is a vertical longitudinal sectional detail taken on line 9—9 of Figure 2, illustrating a portion of the work piece carrier on an enlarged scale.

A flexible shaft not shown but encased in the housing 16 is also driven from the pulley 13 by means of rotation of the pulley 13, so that the rotation of the motor 7 is imparted to the flexible shaft within the housing 16. The flexible shaft drives members positioned within the housing 17, which members may include gears or other parts. A shaft 18 extends from this housing and is driven by the parts referred to and carry a pulley 19 upon which a belt 20 may be positioned. This belt engages and may drive a pulley 21, which is preferably loosely mounted on a shaft 22. This shaft 22 is carried in suitable bearings which are themselves mounted in housings 23, 23 supported from a second frame structure which includes vertical frame structures 24, 24, and transverse members 25, 25 and 25a, 25a, as well as longitudinal members 26, 26. These longitudinal members may be as shown in the form of tracks or there may be additional longitudinal members. Fixed to the shaft 22 is a pinion 27 which meshes with a rack 28. This rack is secured as shown particularly in Figures 2 and 9 to the bottom of a carrier table which includes a generally plane surface member 29 provided with end members 30, 31, and if desired, with side members 32, 33. One or more spring-like members 34 may be mounted to extend over part of the upper surface of the member 29. These members 34 may be considered as spring clips which yieldingly engage the work piece or pieces upon which sewing is to be done. The carrier with its associated parts is movably supported upon the rails 26 by means of preferably flanged rollers 35, 35, which are supported for rotation from brackets 36, 36, themselves secured to the carrier member 29 or secured elsewhere to the carrier assembly. On its under face the member 29 is provided with a rail or track portion 37 which is preferably adjacent to and may be formed as a part of the rack 28. However it is formed and wherever it is positioned, it is engaged by one or more flanged rollers 38. As shown in Figures 3 and 9 there are two such rollers 38 and they are supported for rotation in a member 39 which is supported from the shaft 22.

Means for driving the shaft 22 so as to rotate the pinion 27 will now be described. The pulley 21 may be rotated independently of the shaft 22. As above mentioned it is free on the shaft 22. However, it is provided with a clutch face 40 which is positioned to be engaged by a member 41 which has a clutch face and which is keyed upon the shaft 22. The member 41 is also provided with a groove 42 which may be engaged by jaw members 43 secured to a clutch operating arm 44. When the clutch arm 44 and the member 41 are in the position shown in Figure 2, they do not engage the clutch face 40 of the member 21 and the rotation of the pulley 21 will not impart rotation to the shaft 22.

The clutch operating arm 44 is pivotally supported by any suitable means—for example, by the screw 45. At its lower end it is symmetrically pointed to provide two inclined faces, as at 46, 46, and these faces may be contacted by the corresponding shaft point 47 of a plunger or piston 48 which is movably mounted in a housing 49 and is yieldingly held in the raised position of Figure 8 by a spring 50 which is itself removably and adjustably held in place within the housing 49 by an adjusting plug or screw 51. Secured to the clutch operating lever 44, preferably adjacent its lower end, is a lever operating wire 52, which is preferably enclosed in a tubular housing 53. At its other end the clutch lever operating wire 52 is secured to the controlling means, which also controls the drive of the sewing machine, which will be described below.

As a control for the sewing machine and for the carrier drive, a pedal 54 is provided. This pedal is provided with pins or short shafts 55 which are provided with bearings 56, 56. Extending in the direction of its lower edge the pedal 54 has a slotted member 57 which is adjustably secured to the pedal and held in place by screws 58 (see Figure 7). Extending from the member 57 is an arm 59. In an extension 60 of the arm 59 there is mounted for rotation a member 61 and in the member 61 an end of the wire or cable 52 is mounted. Thus movement of the pedal moves the members 60 and 61 and moves the wire 52 to move the position of the clutch so as to cause the shaft 22 to be driven or not to be driven depending upon the position in which the clutch is moved. Obvious the wire operating means could be operated elsewhere on the pedal. The end of the housing 53 of the wire 52 is received and secured in a tubular member 62 which is itself mounted in the block or housing 63.

Secured to the pedal and preferably on the end opposite to that to which the member 57 is secured is a member 64, provided with a pair of ears 65, 65, through which a pin 66 passes. One end of a cable or link 67 is secured to the pin 66 and at its other end the link or cable 67 is secured to an eye formed in one arm of a lever 68. The lever itself is pivoted as at 69 on a member 70 which is supported from the table member 4. A spring 71 is secured at one end to the lever arm 68, and at the other end to the table 4 and serves normally to hold the lever arm 68 in the raised position. The arm 72 of the lever has secured to it a brake pad 73 which may contact a braking surface 74. This is preferably formed on a brake drum or similar rotary member secured to some part which rotates when the pulley 13 is rotated. The spring 71 will, when free to do so, raise the arm 68, thereby depressing the arm 72 and bringing the brake pad in braking contact with the surface of the member 74, and thus stopping rotation of the sewing machine and of the flexible shaft which is enclosed in the housing 16.

Secured to one of the transverse members 25 of the carrier assembly is a support 75 to which is secured the flange 76 of a plug-like member 77. The rounded portion 78 of the plug member 77 extends within a tube 79 and is provided with a perforated tongue 80 within which one end of a spring 81 is engaged. The plug-like member 78 is perforated as at 82 and a lateral perforation 83 forms an extension of the perforation 82. A threaded member 84 is received in a correspondingly threaded perforation or cavity 85 and carries a tapered valve member 86 which may be fitted in a tapered seat 87 in the perforation 83. The member 84 is notched as at 88 to be engaged by a screw driver or other suitable tool, and thus to be adjusted back and forth to vary the position of the valve 86 and consequently to vary the effective size of the passage 83 through which air may escape under conditions which may be described below.

At its opposite end the tube 79 is engaged upon the rounded portion 89 of a plug member 90 which is provided with a flange 91 secured to a support 92 which is itself secured to one of the cross members 25. The plug member 89 is not perforated. Intermediate its ends the tube 79 is slotted as at 93. A piston 94 is positioned within the tube 79 and has secured to it one end of a spring 81. A piston rod 95 extends away from the spring and is reduced at 96. A shoulder 97 is formed at the juncture of the reduced portion 96 with the unreduced portion 95. A washer 98 may be positioned in contact with the shoulder, and a rounded member 99 is positioned in contact with the washer. The member 99 is provided with a downward extension 100 which extends through the slot 93. A tubular member 101 is positioned about the reduced portion 96 of the shaft 95, and is provided with an end enlargement 102 which is in contact with the member 99. The member 101 is also provided with an enlargement 103 which is of substantially the same diameter as the interior of the tube 79. Nuts 104 and 105 are engaged upon the threaded outer end of the reduced portion 96 and hold the parts just described in position upon the shaft.

Secured to the table surface portion 29, preferably on its under surface, is a bracket portion 106 from which a plate-like member 107 extends downwardly. This member is bifurcated to provide the ears 108, 108, which overlie and are out of contact with the tubular member 79, but which lie in the same general plane with the member 99, and its downward extension 100. The lower ends of the arms 108 and of the member 100 are secured between plate-like members 109 and 110, and are held in position by nuts and bolts 111.

A bracket 112 is secured to the cross frame member 25 by bolts 113. It is provided with a cushioning pad 114 of rubber or the like. A member 115 is secured to the under side of the carrier member 29 and has a stop portion 116 which extends downwardly in the path of the bracket 112.

A projecting member 117 on the pedal 54 is adapted to close the switch points 118 and 119, thereby energizing the motor 7 when the pedal 54 is depressed by the operator.

It will be realized that whereas we have described and shown a practical and operative embodiment of our invention and the method for carrying it out, nevertheless many changes may be made in the size, shape, number and disposition of parts and in the details and steps of such method without departing from the spirit of our invention. We therefore wish our description and drawings to be taken as in a broad sense illustrative or diagrammatic, rather than as limiting us to our precise showing.

The use and operation of the invention are as follows:

The device of this invention can be used as a work support for a variety of different sorts of work. In its preferred form it is intended to carry fabric past a sewing machine so that the fabric is sewn as it moves and the speed of movement of the work support is synchronized with the speed of operation of the sewing machine so that the work is moved past the sewing machine at the speed at which the sewing machine sews.

As shown several layers of fabric are arranged on the carrier, and they comprise folded sheets of fabric which are removably held in place by the spring clips 34. A seam is to be made in the edge of each sheet of material, and as shown in Figures 1 and 2 particularly, the seam is being made. In the plan view of Figure 1 the work is just commencing, and the carrier will move toward the top of the figure past the sewing machine table 4 and past the needle 2 as the seam is made. To operate the device, the operator steps down on the pedal 54—that is to say, the operator depresses the upper edge of the pedal and thus pulls down on the cable 67. This movement through the member 117 closes the switch 118, 119 and at the same time raises the brake carrier 72 so that as the motor starts, the rotary parts arranged to be driven by the belt 12 are free for rotation. As this rotation occurs, the sewing machine is operated and stitching begins. At the same time through the flexible shaft 16 and the gearing within the housing 17, the shaft 18 and pulley 19 are rotated so that the belt 20 drives the pulley 21 on the shaft 22. When the upper edge of the pedal 54 is depressed, the lower edge rises, and thus the control wire 52 is caused to move, carrying the clutch member 44 from the full-line position of Figures 2 and 8 to the dotted line position of Figure 8. This operates the clutch member 41 to engage the clutch member 40 on the pulley 21 and fastens the pulley to the shaft 22 so that the shaft is rotated as the pulley rotates.

Rotation of the shaft 22 rotates the pinion 27 which engages the rack 28. The driving rotation is in a clockwise direction, as the parts are viewed in Figures 3 and 9. Rotation of the pinion 27, since the latter engages the rack 28, moves the carrier upward as viewed in Figure 1 and to the right from the position of Figures 3 and 9, and thus the carrier with the work pieces upon it is moved along past the sewing machine table 4.

As the carrier is driven by the pinion 27, the piston 94 moves along the cylinder 79 and also extends the spring 81. The spring thus imposes some resistance to the movement of the carrier 29 in the direction in which it is moved when sewing takes place.

When the seam has been finished, the operator reverses the position of the pedal 54, depressing its lower edge and raising its forward edge. When this occurs the spring 71 moves the brake carrier 72 to bring the brake shoe 73 in contact with the drum 74, and thus stops the rotation of the parts driven from the belt 12. At the same time the contact of the switch 118 and 119 is broken and the flexible shaft within the member 16 stops rotating.

As the lower edge of the pedal 54 is lowered, the wire 52 is drawn in and the clutch member 44 is moved again to the full-line position of Figures 2 and 8, and thus the clutch part 41 is moved out of engagement with the clutch part 40 of the pulley 21, and the latter thereby becomes free upon the shaft 22. When the pulley 21 is free on the shaft 22, although it still engages the rack 28, it can neither drive nor hold the rack in any position and the spring 81 is then free to contract, which it does, thus returning the carrier 29 toward its starting position. The final part of the return movement is cushioned by the piston 94, which when it passes the slot 93 of the cylinder 79, shown in Figure 4, compresses the air within the cylinder to a predetermined degree. The degree of compression is controlled by the setting of the valve 86, which may be moved to provide a greater or less clearance through the passages 87 and 83. Thus, an air cushion is provided to control the latter part of the return movement of the carrier 29. As the carrier finishes its return movement and reaches its original position, the stop 116 contacts the cushion member 114 on the fixed stop 112. These parts serve as a final shock absorbing stop.

The operation above described is one complete cycle in sewing a seam. The operator, upon the completion of the cycle, removes one of the sheets and repeats the cycle to sew a seam or otherwise to sew a row of stitches in the next sheet. If a folded sheet is used, as shown, the operator may merely push the sewn part down so that it hangs below the table along the side member 33, and at the same time, or shortly thereafter, the operator will move the next sheet of material into the sewing position, and the cycle of operations above described will be repeated.

The invention is not limited to sewing any particular type of stitch or upon any particular type of work. What has been described as a seam may be considered as any sewing which is desired. The edge of the fabric may be turned over, as shown in Figures 1 and 2 and this edge sewn in place, or other sewing may be accomplished. Obviously, the details of the sewing machine form no essential part of the invention, and the work carrier may be associated with sewing machines of many different types, whether they be simple or complicated, and whether they be machines using a single needle or multiple needles.

Whatever the type of sewing machine, and whatever the exact size and proportion of the work carrier, they will have in common a mechanism by means of which the work carrier is moved in synchronism with the sewing machine, so that the work upon which sewing is being done moves past the sewing machine at the proper speed for satisfactory sewing, and the mechanism provides means for returning the work carrier to the starting point, preferably much more rapidly than it was moved during the time of sewing, so as to save time. Also the mechanism provides in a single and preferably foot controlled means for controlling the operation of the sewing machine to start and stop it at the desired time, and means whereby the movement of the work carrier is also automatically controlled by the same means. Therefore, the operator has to think of but one control, and by operating that control the operator is able without any extra operations to control the movement of the work carrier and to control it in proper synchronism with the sewing machine.

We claim:

1. In combination, a sewing machine and a work-carrier positioned adjacent thereto, a single electric motor for driving the machine and the carrier, a switch for controlling the motor, a driving transmission from the motor to the sewing machine, and a separate driving transmission from the motor to the carrier, a clutch in said carrier driving transmission, a single foot-controlled pedal means, a connection from said pedal to said machine-driving transmission, and a separate connection from said pedal to said clutch, means on said pedal adapted to operate said switch, a single movement of the pedal being effective to operate said switch, to move said motor-driving transmission into operative position and to move said clutch into operative position.

2. In combination, a tool and a carrier positioned adjacent thereto and adapted to be moved to carry material past said tool, an electric motor for driving said tool and said carrier, a switch for stopping and starting said motor, transmission means for driving said tool from said motor, a control for said transmission means, and a second transmission means adapted to be actuated by said first transmission means and arranged to drive said carrier, said second transmission means including a clutch mechanism, there being a control for said clutch mechanism adapted to be actuated to move it into operative and inoperative position, and a single pedal, said pedal provided with means for operating said motor switch, there being a connection from said pedal to said motor transmission control means, and a connection from said pedal to said clutch-operating means.

3. In combination, a tool and a carrier positioned adjacent thereto and adapted to carry material past said tool while said tool is in operation, an electric motor, a power transmission from said motor to said tool, a switch for said motor and a control for said transmission, a power transmission from said motor to said carrier, a clutch in said transmission, means for operating said clutch, a unitary controlling member, means on said controlling member for operating said motor switch, a connection from said controlling member to said tool transmission means, and a connection from said controlling member to said carrier transmission means, said last-mentioned connection including parts adapted to operate said clutch mechanism, a single movement of said controlling member in one direction being effective to operate said switch, to start the motor, to move the tool transmission means into operative position, and to actuate the carrier transmission and to move the clutch in said transmission into operative position.

4. In combination, a tool and a carrier positioned adjacent thereto and adapted to carry material past said tool while said tool is in operation, an electric motor, a power transmission from said motor to said tool, a switch for said motor and a control for said transmission, a power transmission from said motor to said carrier, a clutch in said transmission, means for operating said clutch, a unitary pedal controlling member, means on said pedal for operating said motor switch, a connection from said pedal to said tool transmission means, and a connection from said pedal to said carrier transmission means, said last-mentioned connection including parts adapted to operate said clutch mechanism, a single movement of said pedal in one direction being effective to operate said switch, to start the motor, to move the tool transmission means into operative position, and to actuate the carrier transmission and to move the clutch in said transmission into operative position.

5. In combination, a sewing machine and a work-carrier positioned adjacent thereto, a single electric motor for driving the machine and the carrier, a switch for controlling the motor, a driven member, means for driving it from the motor, a brake adapted to act upon said driven member, a driving connection from said driven member to said machine, and a transmission from said driven member to said carrier, there being a clutch in said transmission and adapted to control the carrier drive, and a clutch operating means, a unitary controlling means including a pedal, means on said pedal for operating said switch, a connection from said pedal to said brake, and a connection from said pedal to said clutch operating means, a single movement of said pedal being effective to close said switch to move the brake to permit rotation of the driven member and to move the clutch operating means into position to engage the clutch and to complete the carrier driving transmission.

ERNEST M. RUNQUIST.
LOTHAR A. EDERER.